(12) United States Patent
Kim

(10) Patent No.: US 8,865,103 B2
(45) Date of Patent: Oct. 21, 2014

(54) METHOD FOR PRODUCING CARBON MICRO- AND NANO-COILS USING SULFUR HEXAFLUORIDE GAS

(71) Applicant: Silla University, Busan (KR)

(72) Inventor: Sunghoon Kim, Yangsan-si (KR)

(73) Assignee: Silla University (KR)

( * ) Notice: Subject to any disclaimer, the term of this patent is extended or adjusted under 35 U.S.C. 154(b) by 45 days.

(21) Appl. No.: 13/653,697

(22) Filed: Oct. 17, 2012

(65) Prior Publication Data

US 2014/0065055 A1    Mar. 6, 2014

(51) Int. Cl.
*D01C 5/00* (2006.01)

(52) U.S. Cl.
USPC ....................................... 423/445 B; 977/742

(58) Field of Classification Search
USPC ....................................... 423/445 B; 977/742
See application file for complete search history.

(56) References Cited

PUBLICATIONS

Schulz, M. J., et al. "The Columbi Eggs of Nanotechnology". Nanotechnology, 2006. IEEE-NANO 2006. Sixth IEEE Conference on (vol. 2 ) p. 698-701.*
J. H. Eum, et al., Large-Scale Synthesis of the Controlled-Geometry Carbon Coils by the Manipulation of the SF6 Gas Flow Injection Time, Journal of Nanoscience and Nanotechnology, 2012, vol. 12, p. 4397-4402.
Y. C. Jeon, et al., Effect of the on/off Cycling Modulation Time Ratio of C2H2/SF6 Flows on the Formation of Geometrically Controlled Carbon Coils, Journal of Nanomaterials, 2012, p. 1-6.
Y. C. Jeon, et al., Formation of the Geometrically Controlled Carbon Coils by Manipulating the Addictive Gas (SF6) Flow Rate, Journal of Nanoscience and Nanotechnology, 2012, vol. 12, p. 5957-5961.
J. H. Eum, et al., Effect of Gas Phase Composition Cycling On/Off Modulation Numbers of C2H2/SF6 Flows on the Formation of Geometrically Controlled Carbon Coils, Journal of Nanoscience and Nanotechnology, 2012, vol. 12, p. 6100-6106.
S. H. Lee, et al., Effect of Gas Phase Cycling Modulation of C2H2/SF6 Flows on the Formation of Carbon Coils, Journal of the Korean Vacuum Society, May 2012, vol. 21, p. 178-184.
S. H. Kim, Effect of Reaction Temperature on the Geometry of Carbon Coils Formed by SF6 Flow Incorporation in C2H2 and H2 Source Gases, Journal of the Korean Vacuum Society, Jan. 2012, vol. 21, p. 48-54.
Davis, et al., An unusual form of carbon, Nature, 1953, vol. 171, p. 756.

* cited by examiner

*Primary Examiner* — Richard M Rump
(74) *Attorney, Agent, or Firm* — Cantor Colburn LLP

(57) ABSTRACT

The present invention relates to a method for producing carbon micro- and nano-coils using sulfur hexafluoride gas, wherein the carbon micro- and nano-coils are synthesized and grown on a ceramic substrate and sulfur hexafluoride is introduced during the synthesis of the carbon coils to control the geometry of the carbon coils. The invention also discloses a method of producing carbon micro- and nano-coils by synthesizing and growing the carbon coils on a substrate using a chemical vapor deposition system, wherein sulfur hexafluoride ($SF_6$), acetylene ($C_2H_2$) and hydrogen ($H_2$) gases are introduced into a chamber during synthesis of the carbon coil, and wherein the sulfur hexafluoride and acetylene gases are introduced alternately for predetermined amounts of time, or any one or more of the flow rate, time or time point of introduction of the sulfur hexafluoride, thereby controlling the shape, length and geometry of the carbon coils.

7 Claims, 18 Drawing Sheets

FIG. 5

METHOD FOR PRODUCING CARBON MICRO- AND NANO-COILS USING SULFUR HEXAFLUORIDE GAS

BACKGROUND OF THE INVENTION

1. Field of the Invention

The present invention relates to a method for producing carbon micro- and nano-coils using sulfur hexafluoride gas, and more particularly to a method for producing carbon micro- and nano-coils using sulfur hexafluoride gas, wherein the carbon micro- and nano-coils are synthesized and grown on a ceramic substrate and sulfur hexafluoride is introduced during the synthesis of the carbon coils to control the geometry of the carbon coils.

2. Description of the Prior Art

It is known that carbon microcoils (hereinafter referred to as CMCs) can be synthesized with micrometer or nanometer dimensions and was found by Davis et al. in 1953 (An unusual form of carbon, Nature, 171 (1953) 756). Many new materials are currently used in industrial applications, and among them, carbon fibers are widely used as new reinforcing materials. Carbon microcoils are defined as amorphous carbon fibers coiled with a pitch of 1/1000 mm (micrometer) and are new carbon materials which are expected to be widely used in electromagnetic absorbers, microwave heating materials, tactile proximity sensors, micro-antennas, biological activators and like.

CMCs can be synthesized by thermally decomposing acetylene containing a trace amount of sulfur impurities in the presence of a catalyst such as Ni, but are very difficult to grow compared to carbon nanotubes. Thus, if a catalyst, reaction conditions and system conditions are not optimized, only fine carbon powders or straight carbon fibers will be obtained. As the raw material, acetylene is mainly used, and methane, propane, benzene or the like may also be used, but in this case, the yield and stability of the resulting coils will be reduced. One of the special features of CMCs is excellent elasticity. Coils having a large diameter and coils having a small fiber diameter show very high elasticity in that the original length of the coils can be stretched by about 15 times. Micro- or nano-sized CMCs have a high degree of new functions which cannot be obtained in existing materials, and thus they are expected to be suitably used in applications in which existing materials cannot be used.

SUMMARY OF THE INVENTION

It is an object of the present invention to provide a method for producing carbon micro- and nano-coils, in which the morphology, length and geometry of the carbon coils can be variously changed by introducing sulfur hexafluoride gas during the synthesis of the carbon coils and controlling the conditions of the gas supply.

The objects to be achieved by the present invention are not limited to the above-mentioned object.

To achieve the above object, in one aspect, the present invention provides a method of producing carbon coils by synthesizing and growing the carbon coils on a substrate using sulfur hexafluoride and acetylene gases, wherein sulfur hexafluoride comprising sulfur and a halogen group element may be introduced during a reaction for synthesizing the carbon coils.

Specifically, the time of introduction of the sulfur hexafluoride ($SF_6$) may be controlled to between 1 minute and 90 minutes to synthesize geometrically controlled carbon coils.

In another aspect, the present invention provides a method of producing carbon coils by synthesizing and growing the carbon coils on a substrate using a chemical vapor deposition system, wherein sulfur hexafluoride ($SF_6$), acetylene ($C_2H_2$) and hydrogen ($H_2$) gases are introduced into a chamber during synthesis of the carbon coils, wherein the sulfur hexafluoride and acetylene gases are introduced alternately for predetermined amounts of time to control the shape, length and geometry of the carbon coils.

Specifically, the time interval between the start of introduction of any one gas of the sulfur hexafluoride and acetylene gases and the start of introduction of the other gas may be controlled to between 5 seconds and 90 minutes.

The number of repeats of the alternating introduction of the sulfur hexafluoride and acetylene gases may be controlled to between 1 and 50.

In still another aspect, the present invention provides a method of producing carbon coils by synthesizing and growing the carbon coils on a substrate using a chemical vapor deposition system, wherein sulfur hexafluoride ($SF_6$), acetylene ($C_2H_2$) and hydrogen ($H_2$) gases are introduced into a chamber during synthesis of the carbon coils, wherein any one or more of the flow rate, time or time point of introduction of the sulfur hexafluoride are controlled to control the shape, length and geometry of the carbon coils.

Specifically, the flow rate of introduction of the sulfur hexafluoride may be controlled between 5 sccm (standard cc per minute) and 50 sccm.

When the flow rate of introduction of the sulfur hexafluoride is between 5 sccm and 50 sccm, the sulfur hexafluoride may be introduced for 2 minutes to 90 minutes.

The time point of introduction of the sulfur hexafluoride may be divided into an initial stage of synthesis and a middle stage, and the sulfur hexafluoride may be introduced at the initial stage of synthesis and the middle stage.

The initial stage of synthesis may be within 20% of the first half of the total reaction process time for synthesis of the carbon coils.

The middle stage of synthesis may be in the range from 1/2 of the total reaction process time for synthesis of the carbon coils to ±20%.

BRIEF DESCRIPTION OF THE DRAWINGS

FIG. 5 schematically shows processes of introducing gases during a process of synthesizing carbon coils according to examples of the present invention.

DETAILED DESCRIPTION OF THE INVENTION

Figure 1:
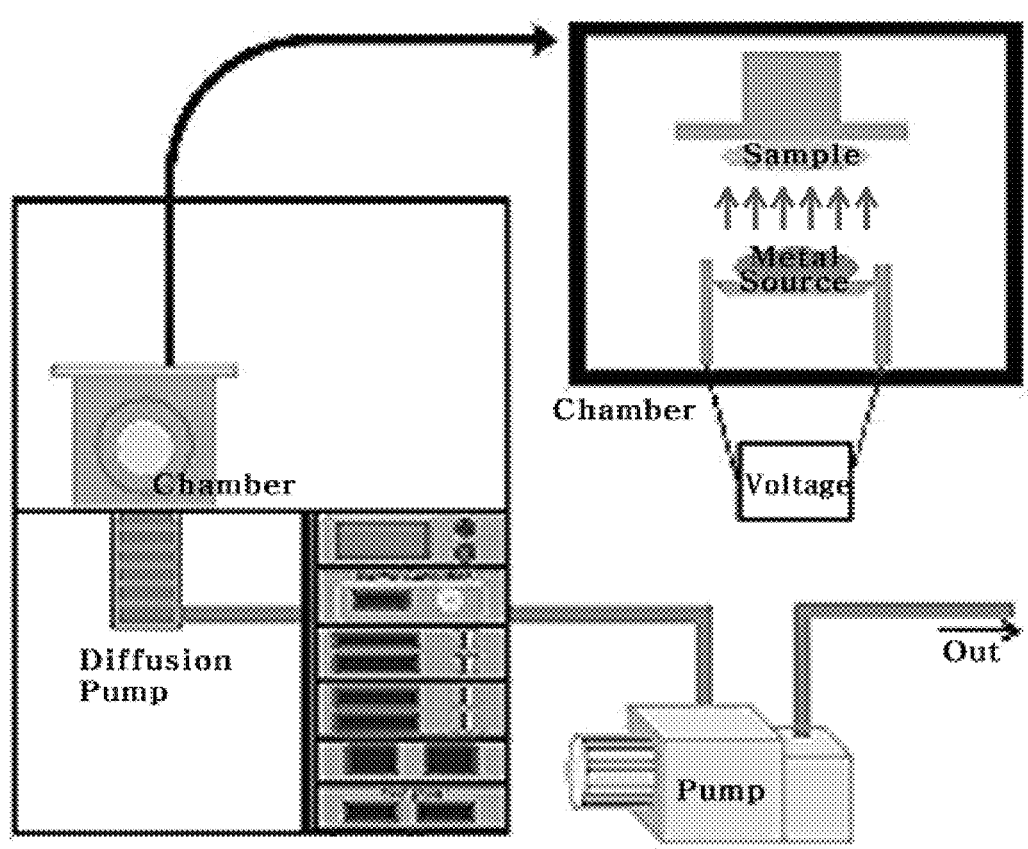
FIG. 1 is a schematic diagram showing a thermal evaporation coater for synthesizing carbon coils according to the present invention.

Hereinafter, exemplary embodiments of the present invention will be described in detail with reference to the accompanying drawings. It should be noted that the same components are indicated by the same reference numerals anywhere possible in the drawings. Further, when it is determined that detailed description relating to well-known functions or configurations may make the subject matter of the present invention unnecessarily ambiguous, the detailed description will be omitted.

Embodiments of the present invention can be modified into various other forms, and the scope of the present invention is not intended to be limited to these embodiments.

According to the present invention, carbon coils, which could sometimes be found only as a small amount of impurities in MWCNTs (multiwalled carbon nanotubes), are synthesized in large amounts by adding sulfur hexafluoride ($SF_6$) gas during the synthesis of the carbon coils. The synthesis of carbon coils may be performed using any system selected from a physical vapor deposition (PVD) thermal evaporation coater, a plasma-enhanced chemical vapor deposition (PE-CVD) system and a thermal chemical vapor deposition system, which are widely used in the art. In addition, among chemical vapor deposition systems having concepts similar to those of the above systems, any vapor deposition system may be used as long as it uses gases for the synthesis of carbon coils.

FIG. 1 is a schematic diagram showing a PVD thermal evaporation coater which is used to deposit a metal catalyst for synthesizing carbon coils. Using the PVD thermal evaporation coater, a metal catalyst comprising a composite of high-purity components is deposited on a $SiO_2$ substrate.

In a pretreatment process for synthesizing carbon coils according to the present invention, a metal catalyst film can be formed by placing 0.01-1 mg of powder composed of 95-99% pure iron, cobalt, nickel, tungsten or an alloy thereof, on the substrate in the PVD thermal evaporation coater, and applying a current of 1-100 A to the inside of the PVD thermal evaporation coater for 10-200 seconds in a high-vacuum atmosphere of 0.001 Torr or less.

Figure 2:
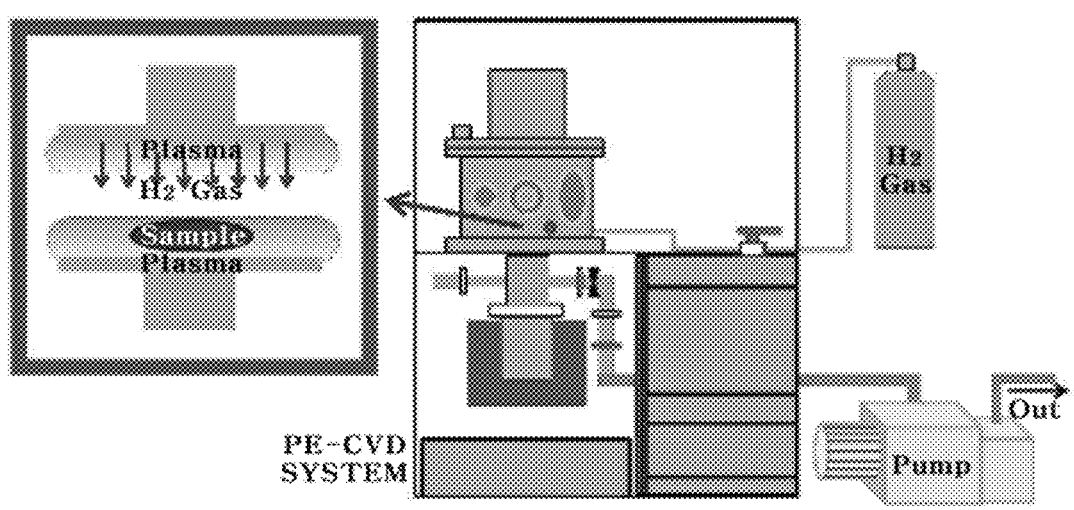
FIG. 2 is a schematic diagram showing a plasma-enhanced chemical vapor deposition (PECVD) system for synthesizing carbon coils according to the present invention.

FIG. 2 is a schematic diagram of a plasma-enhanced chemical vapor deposition (PE-CVD) system which is used to plasma-treat the substrate on which the metal catalyst for synthesizing carbon coils has been deposited. In order to deposit improved carbon coils, the substrate coated with the metal catalyst comprising a composite of high-purity components is etched and cleaned using the plasma-enhanced chemical vapor deposition (PE-CVD) system.

The substrate having the metal catalyst deposited thereon is placed in the plasma-enhanced chemical vapor deposition (PE-CVD) system and is treated with hydrogen plasma (produced from 10-100 sccm of hydrogen gas introduced into the PE-CVD system) at a pressure of 0.1-2.0 Torr for 1-10 minutes, thereby etching and cleaning the substrate.

Figure 3:
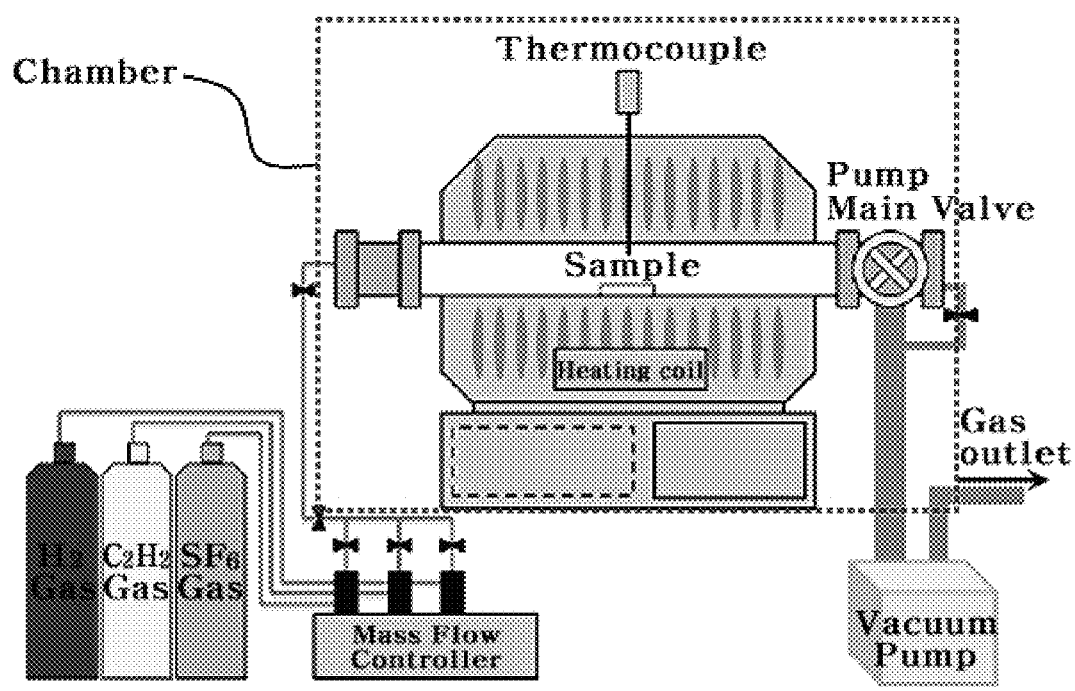
FIG. 3 is a schematic diagram showing a thermal-chemical vapor deposition (T-CVD) system for synthesizing carbon coils according to the present invention.

FIG. 3 is a schematic view of a thermal-chemical vapor deposition (T-CVD) system which is used to form carbon coils according to the present invention. Using the thermal-chemical vapor deposition (T-CVD) system, carbon coils are deposited.

The subject subjected to the above pretreatment and catalyst deposition is placed in the center of a reaction tube in the thermal-chemical vapor deposition (T-CVD) system together with a boat serving as a support, and a mixed gas of a hydrocarbon compound such as source gases acetylene ($C_2H_2$) and hydrogen ($H_2$) is placed and sulfur hexafluoride ($SF_6$) is added thereto as an additive gas. Herein, the flow rate of each of acetylene ($C_2H_2$) gas, hydrogen ($H_2$) gas and sulfur hexafluoride ($SF_6$) gas is set to 5-50 sccm, and carbon coils are synthesized using these gases at a temperature of 600~900° C. In the synthesis process, the supply time of sulfur hexafluoride ($SF_6$) gas can be variously changed so that carbon coils having various geometrical shapes and sizes can be synthesized.

Figure 4:
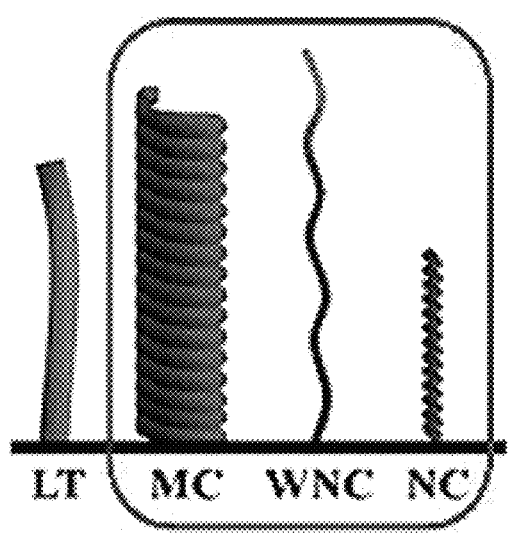
FIG. 4 shows various morphologies of carbon coils related to the present invention.

According to the present invention, sulfur hexafluoride and acetylene gases are introduced alternately into a chamber in order to produce carbon coils having a desired shape. The shapes of carbon coils sought in the present invention are MC, WNC and NC among the carbon coil shapes shown in FIG. 4. Specifically, synthesized carbon coils have various morphologies, that is, various sizes and shapes, as shown in FIG. 4. LT (linear type) is a shape not developed into carbon coils and is not the carbon coil shape sought in the present invention. MC (microsized coil) is a carbon coil having a diameter of micrometers or larger, and is developed into a shape like a spring. Meanwhile, WNC (wavelike nano-structured coil) has a diameter ranging from nanometers to micrometers, and is not a coil like a spring. In the present invention, such wavelike coils are also produced. Finally, an NC (nano-structured coil) has a diameter ranging from nanometers to micrometers and has a shape developed well into a coil shape like a spring.

Figure 5:
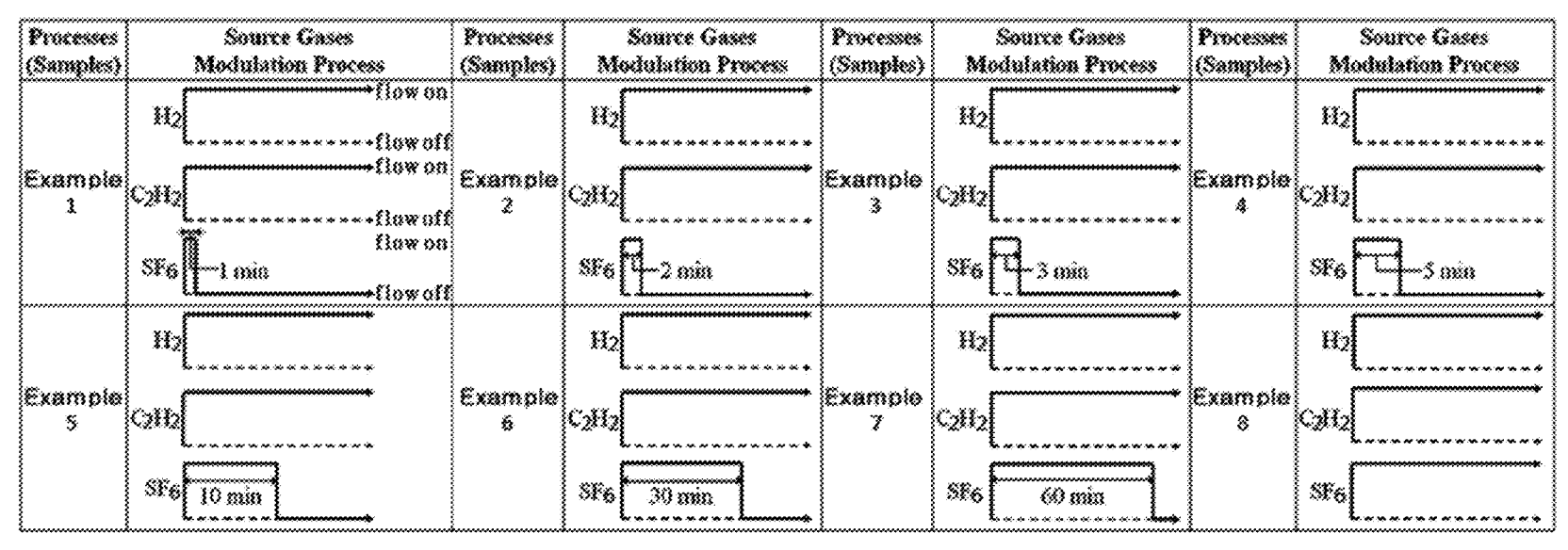

FIG. 5 schematically shows processes of introducing gases during a process of synthesizing carbon coils according to examples of the present invention. Specifically, FIG. 5 shows Examples 1 to 8 which use 8 different flows of sulfur hexafluoride ($SF_6$) in addition to the source gases acetylene ($C_2H_2$) and hydrogen ($C_2H_2/H_2$).

The introduction of gases in the synthesis of carbon coils is carried out as described in the following examples.

EXAMPLE 1

Acetylene and hydrogen gases were continuously introduced into the chamber of a vapor deposition system during the synthesis of carbon coils. Meanwhile, sulfur hexafluoride gas was introduced into the chamber for 1 minute from the time point of the start of the process, thereby synthesizing carbon coils.

EXAMPLE 2

Carbon coils were synthesized in the same manner as Example 1, except that sulfur hexafluoride gas was introduced into the chamber for 2 minutes from the time point of the start of the process.

EXAMPLE 3

Carbon coils were synthesized in the same manner as Example 1, except that sulfur hexafluoride gas was introduced into the chamber for 3 minutes from the time point of the start of the process.

EXAMPLE 4

Carbon coils were synthesized in the same manner as Example 1, except that sulfur hexafluoride gas was introduced into the chamber for 5 minutes from the time point of the start of the process.

EXAMPLE 5

Carbon coils were synthesized in the same manner as Example 1, except that sulfur hexafluoride gas was introduced into the chamber for 10 minutes from the time point of the start of the process.

EXAMPLE 6

Carbon coils were synthesized in the same manner as Example 1, except that sulfur hexafluoride gas was introduced into the chamber for 30 minutes from the time point of the start of the process.

EXAMPLE 7

Carbon coils were synthesized in the same manner as Example 1, except that sulfur hexafluoride gas was introduced into the chamber for 60 minutes from the time point of the start of the process.

EXAMPLE 8

Carbon coils were synthesized in the same manner as Example 1, except that sulfur hexafluoride gas was introduced into the chamber for a period ranging from the time point of the start of the process to the time point of the end (90 minutes).

The morphologies of the carbon coils deposited on the substrates under the above process conditions were observed by FESEM (field emission scanning electron microscopy). FIG. 5 shows FESEM images of the surface morphologies of the carbon coils produced in Examples 1 to 8 while controlling the supply time of sulfur hexafluoride ($SF_6$) gas to control the geometries of the carbon coils.

Figure 6:
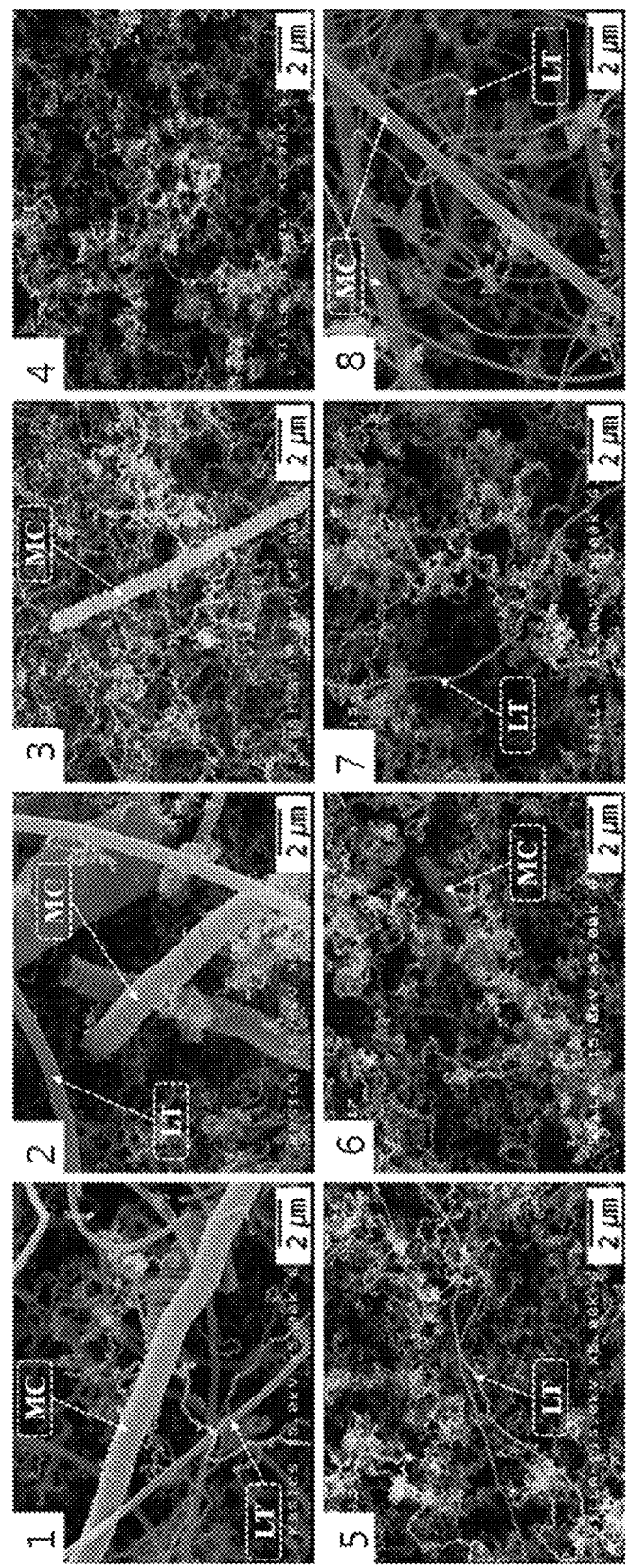
FIG. 6 shows FESEM images of carbon coils synthesized in Examples 1 to 8 of the present invention.
Figure 7:
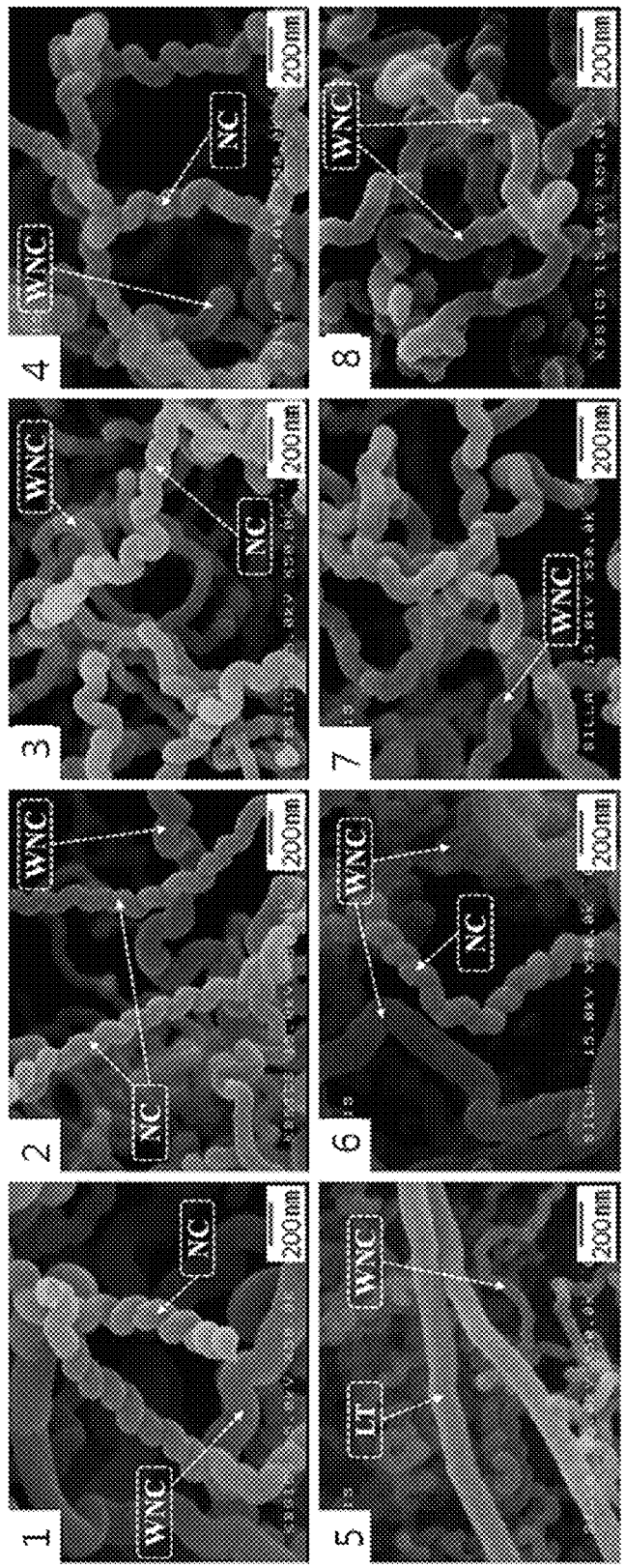
FIG. 7 shows 50,000× magnification FESEM photographs of carbon coils synthesized in Examples 1 to 8 of the present invention.

In FIG. 6, Examples 1 to 3 show the morphologies of the carbon coils obtained by introducing sulfur hexafluoride for 3 minutes or less; Example 4 shows the morphologies of the carbon coils obtained by introducing sulfur hexafluoride ($SF_6$) for 5 minutes; and Examples 5 to 8 show the morphologies of the carbon coils by introducing sulfur hexafluoride ($SF_6$) for 10 minutes or more. As can be seen in FIG. 6, in the case in which the supply time of sulfur hexafluoride gas was 3 minutes or less (Examples 1-3), the carbon coils having various geometrical shapes such as LT and MC could be observed. In addition, FIG. 7 is a set of 50,000× magnification FESEN photographs of the surfaces of the carbon coils synthesized in Examples 1 to 8. In FIG. 7, carbon coils such as NC (nano-structured coil) and WNC (wavelike nano-structured coil) could be observed. Herein, NC (nano-structured coil) and WNC (wavelike nano-structured coil) are defined as those indicated by the arrows in FIG. 7. When the supply time of sulfur hexafluoride ($SF_6$) gas was 5 minutes (Example 4), as shown in FIG. 6, geometrical structures such as LT and MC could not be observed. When the carbon coils of Example 4 were observed by 50,000× magnification FESEM, geometrical structures such as WNC and WC could be found as shown in FIG. 7.

When the supply time of sulfur hexafluoride ($SF_6$) gas was 10 minutes (Example 5), LT could be observed as shown in FIG. 6, and the shape of WNC could not be observed in the 50,000× magnification FESEM photograph of FIG. 7. When the supply time of sulfur hexafluoride ($SF_6$) gas was 20 minutes (Example 6), MC could be observed as shown in FIG. 6, and the formation of NC and WNC could not be observed in the 50,000× magnification FESEM photograph of FIG. 7. When the supply time was 60 minutes (Example 7), carbon coils such as LT and WNC were observed as shown in FIGS. 5 and 6. When sulfur hexafluoride ($SF_6$) gas was continuously introduced over 90 minutes corresponding to the total reaction time (Example 8), carbon coils having various shapes such as LT and MC could be observed as shown in FIG. 6, and the formation of WNC could be observed in the 50,000× magnification FESEM photograph of FIG. 7.

If sulfur hexafluoride ($SF_6$) gas was not introduced, only structures such as linear carbon nanostructures were observed, and no structures associated with carbon coils could be observed. Thus, it can be seen that the addition of sulfur hexafluoride ($SF_6$) according to the present invention plays an important role in the formation of carbon coils.

Figure 8:
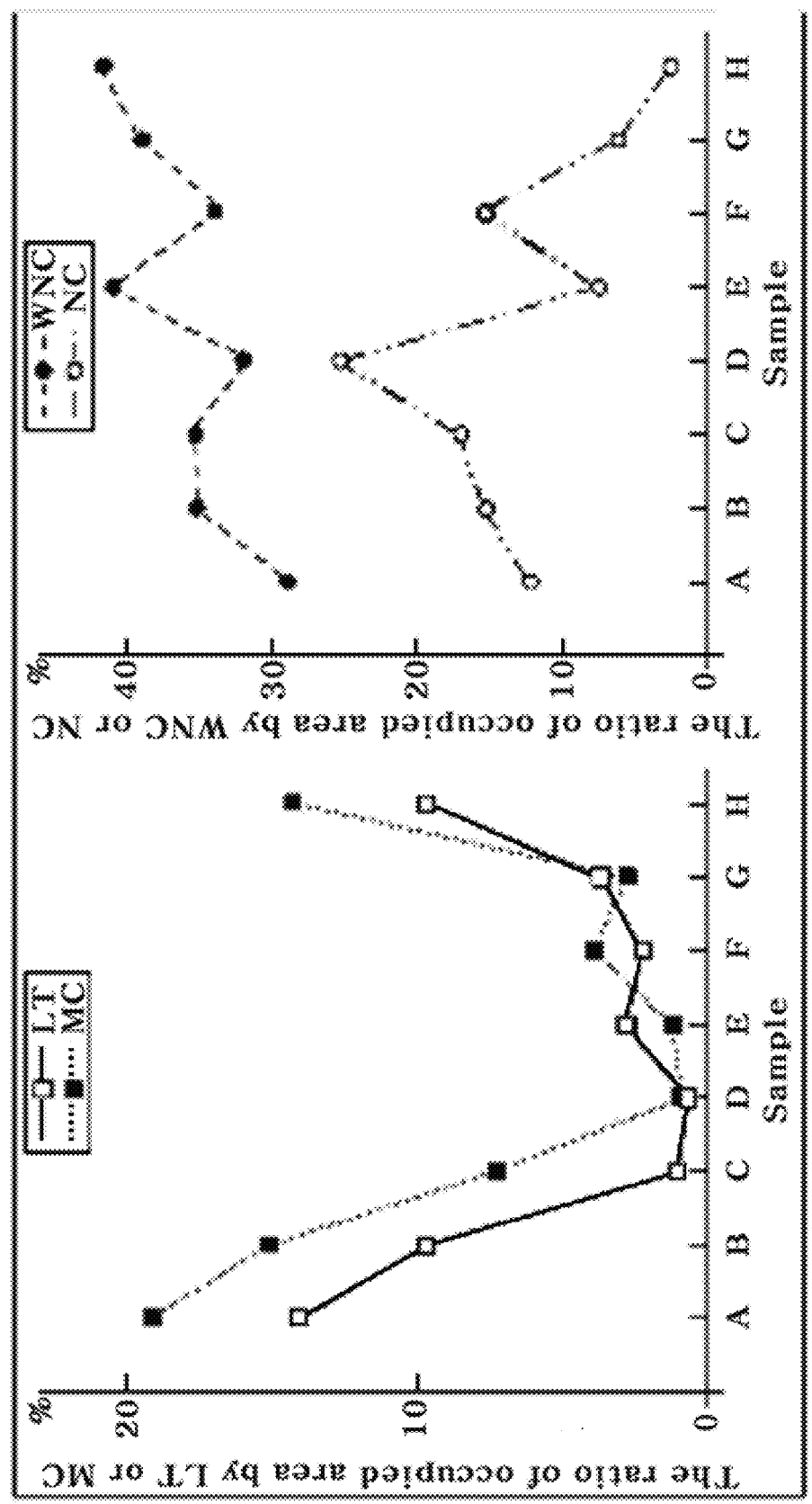
FIG. 8 is a graph showing the ratios of the areas occupied by the LT, MC, NC and WNC of the carbon coils synthesized in Examples 1 to 8 of the present invention relative to a FESEM image.

FIG. 8 shows the ratios of the areas occupied by the carbon coils of Examples 1 to 8 relative to the FESEM image. As can be seen therein, the ratios of the areas occupied by LT and MC among the synthesized carbon coils decreased with an increase in the time of introduction of sulfur hexafluoride ($SF_6$) gas, and then increased. The ratio of the area occupied by NC increased with an increase in the supply time of sulfur hexafluoride ($SF_6$) gas, and then decreased. Also, the ratio of the area occupied by WNC increased with an increase in the gas supply time.

Figure 9:
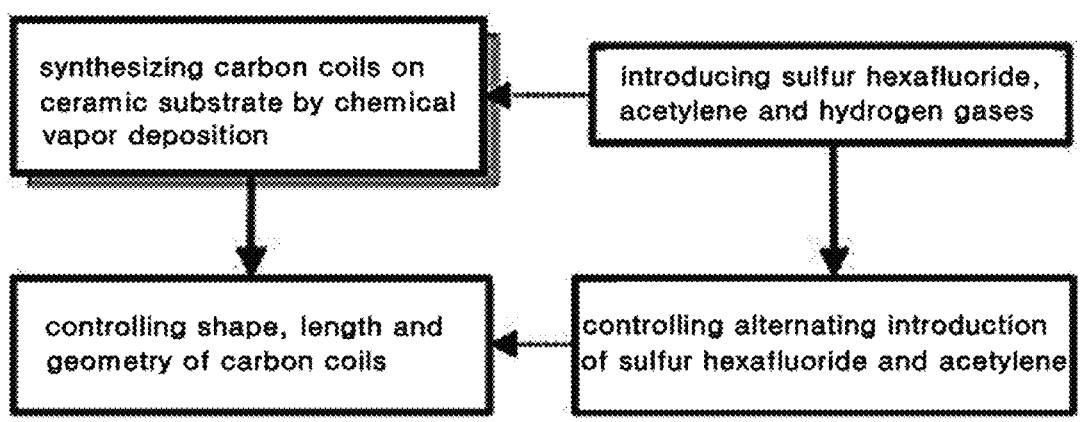
FIG. 9 schematically shows a method for producing carbon coils according to another embodiment of the present invention.

FIG. 9 schematically shows a method for producing carbon coils according to another embodiment of the present invention. In the method shown in FIG. 9, a thermal-chemical vapor deposition system is used in the synthesis of carbon coils. In this method, a ceramic substrate is placed in the chamber of the vapor deposition system, and then carbon coils are grown on the ceramic substrate, thereby obtaining carbon coils having a desired shape. In order to synthesize and grow carbon coils on the substrate, raw materials for carbon coils are heated to a high temperature so that the reactivity of the raw materials is increased, so that carbon coils are synthesized on the surface of the substrate placed in the chamber. Herein, the ceramic substrate may be made of silicon oxide ($SiO_2$), silicon (Si), alumina ($Al_2O_3$), stainless steel, etc.

In this embodiment, reaction gases are introduced onto the substrate in the chamber to synthesize and grow carbon coils. Herein, the reaction gases may be sulfur hexafluoride ($SF_6$), acetylene ($C_2H_2$), hydrogen ($H_2$) gases, etc.

In another embodiment of the present invention as shown in FIG. 9, sulfur hexafluoride ($SF_6$), acetylene ($C_2H_2$) and hydrogen ($H_2$) gases, which are used to synthesize carbon coils on the substrate, are introduced into the chamber, wherein sulfur hexafluoride gas and acetylene gas are introduced alternately for predetermined amounts of time so that the shape, length and geometry of carbon coils are controlled.

Specifically, among the reaction gases which are introduced into the chamber during the synthesis of carbon coils, hydrogen is continuously introduced while sulfur hexafluoride and acetylene gases are introduced alternately into the chamber.

As used herein, the term "introduced alternately" means introducing sulfur hexafluoride and acetylene gases alternately for predetermined amounts of time in order to control the shape, length and geometry of carbon coils, formed on the substrate by chemical vapor deposition, as desired.

Specifically, hydrogen gas is continuously introduced into the chamber and, at the same time, sulfur hexafluoride gas is introduced while the introduction of acetylene gas is interrupted. After sulfur hexafluoride gas has been introduced for a predetermined time, the introduction of sulfur hexafluoride gas is interrupted and acetylene gas is introduced for a predetermined time. This introduction and interruption of each of sulfur hexafluoride and acetylene gases may be repeatedly performed.

In the present invention, the time interval between the start of introduction of any one gas of sulfur hexafluoride and acetylene gases and the start of introduction of the other gas can be controlled and is preferably controlled between 5 seconds and 30 minutes. If the time interval is less than 5 seconds, carbon coils will not be formed, and thus carbon coils having a desired shape cannot be obtained, and if the gas introduction time is longer than 90 minutes, desired micro- or nano-sized coils will not be obtained, and it will be difficult to control the shape of carbon coils and the size of carbon coils will be excessively increased.

In addition, the number of repeats of the alternating introduction of sulfur hexafluoride and acetylene gases can be controlled, and is preferably controlled to between 1 and 50. If the number of repeats of the alternating introduction of sulfur hexafluoride and acetylene gases is less than 1, the shape of carbon coils will not be controlled, because the alternating introduction is insignificant, and if the number of repeats of the alternating introduction is more than 50, desired micro- or nano-sized coils will not be obtained, and it will be difficult to control the shape of carbon coils, carbon coils will not be completely formed, and only a carbon filament shape corresponding to a stage prior to carbon coils will result.

Figure 10:
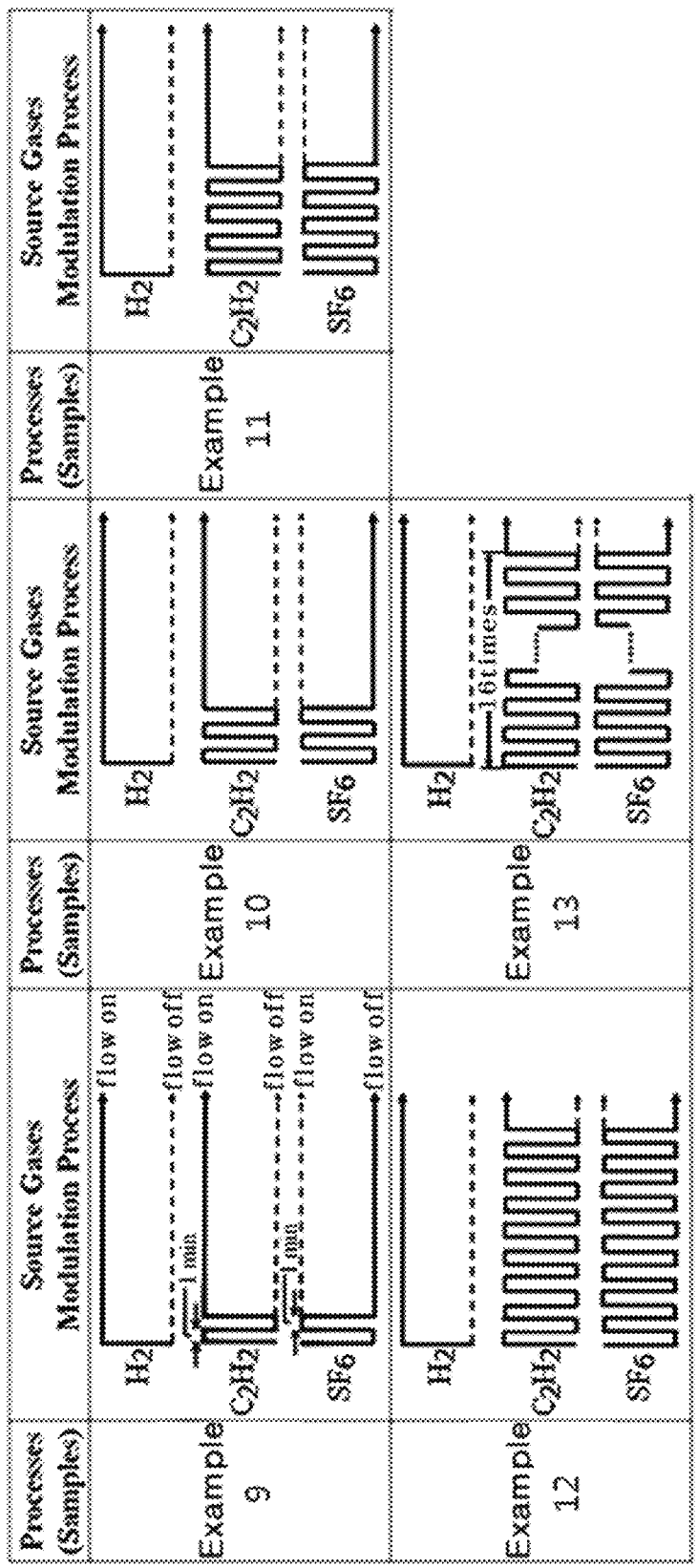
FIG. 10 schematically shows methods for synthesizing carbon coils according to Examples 9 to 13 of the present invention.

In the synthesis of carbon coils, sulfur hexafluoride, acetylene and hydrogen gases are all introduced into the chamber, wherein hydrogen is introduced continuously over a period of time ranging from the time point of the start of the synthesis to the time point of the completion. In addition, sulfur hexafluoride and acetylene gases are introduced alternately in a manner as shown in FIG. 10.

Specific process conditions in each example are as follows.

EXAMPLE 9

While hydrogen gas was continuously introduced into the chamber, sulfur hexafluoride gas was introduced for 1 minute. After completion of the introduction of sulfur hexafluoride, acetylene gas was introduced into the chamber for 1 minute. This alternating introduction of sulfur hexafluoride and acetylene gases was performed once, thereby synthesizing carbon coils.

EXAMPLE 10

Carbon coils were synthesized in the manner as Example 9, except that the alternating introduction of sulfur hexafluoride and acetylene gases was repeated twice.

EXAMPLE 11

Carbon coils were synthesized in the manner as Example 9, except that the alternating introduction of sulfur hexafluoride and acetylene gases was repeated four times.

EXAMPLE 12

Carbon coils were synthesized in the manner as Example 9, except that the alternating introduction of sulfur hexafluoride and acetylene gases was repeated eight times.

EXAMPLE 13

Carbon coils were synthesized in the manner as Example 9, except that the alternating introduction of sulfur hexafluoride and acetylene gases was repeated 16 times.

Figure 11:
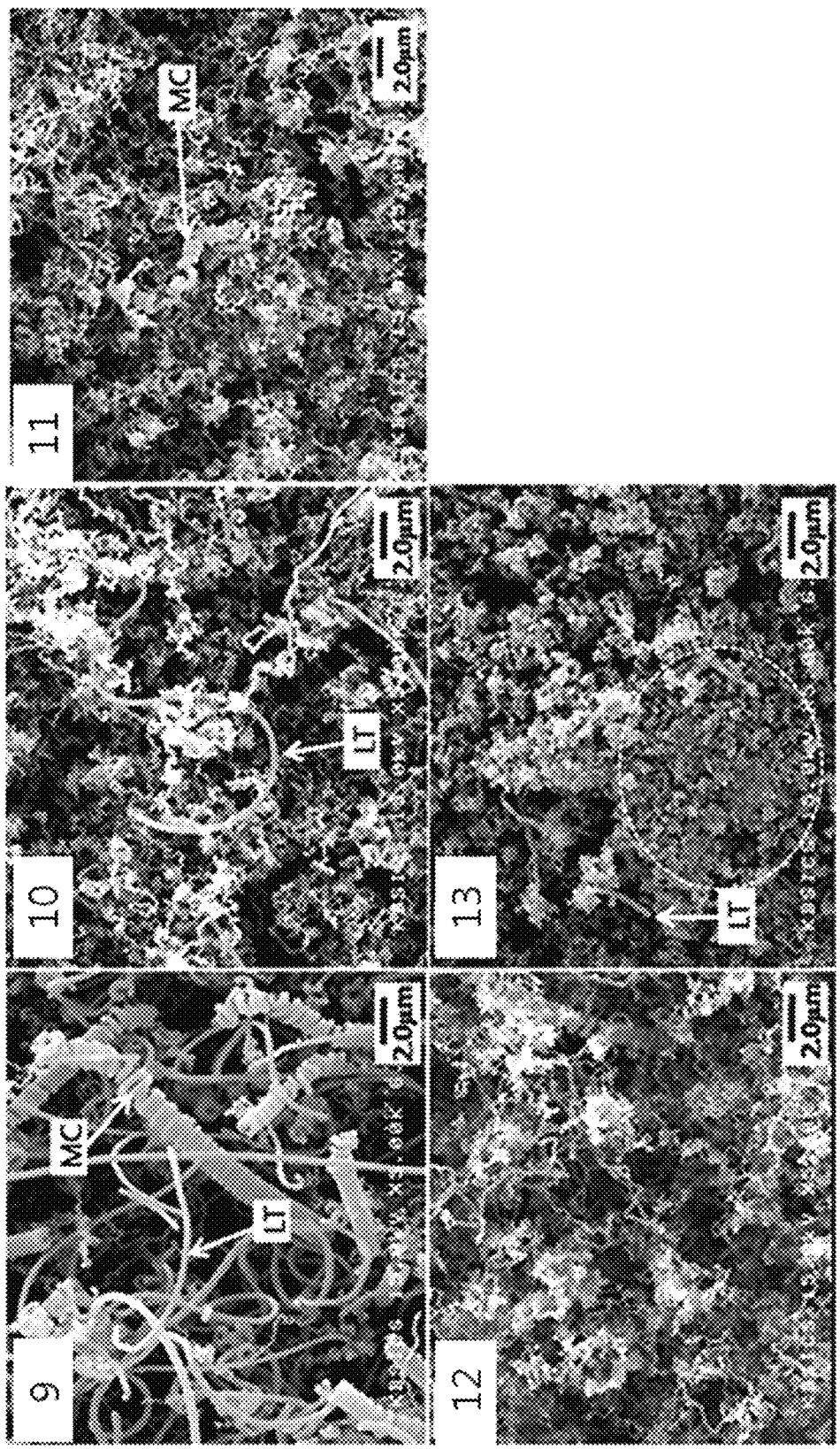
FIG. 11 is a set of FESEM photographs showing carbon coils synthesized in Examples 9 to 13 of the present invention.

FIG. 11 shows the results of FESEM (field emission scanning electron microscopy) observation for the shapes of the carbon coils synthesized in Examples 9 to 13. As can be seen in FIG. 11, the carbon coils synthesized in Examples 9 to 13 were on the order of micrometers or nanometers and were helical or wavy in shape.

Specifically, as can be seen in photographs 9 to 13 in FIG. 11, in the carbon coils synthesized in Examples 9 to 13, carbon coils having the MC shape sought in the present invention were well developed, although the LT shape rarely appeared. In addition, nanosized carbon coils were well developed. Also, as shown in photograph 9 in FIG. 11, in the carbon coils synthesized in Example 9, nano-sized carbon coils having the MC shape were well developed and micro-sized coils having the LT shape appeared. As can be seen in photographs 10 to 12 in FIG. 11, nano-sized carbon coils having the MC shape were well developed. As shown in photograph 13 in FIG. 11, in the carbon coils synthesized in Example 13, micro-sized coils together with nano-sized coils were well developed, and the LT shapes were rarely present.

Thus, it can be seen that the shape, length and geometry of carbon coils can be controlled by controlling the number of repeats of the alternating introduction of sulfur hexafluoride and acetylene gases.

Figure 12:
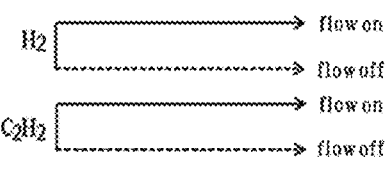
FIG. 12 schematically shows methods for synthesizing carbon coils according to Examples 14 to 17 of the present invention.

In still another embodiment of the present invention, sulfur hexafluoride, acetylene and hydrogen gases are all introduced into the chamber during the synthesis of carbon coils, wherein hydrogen gas is introduced continuously over a period of time ranging from the time point of the start of the synthesis to the time point of the completion. As shown in FIG. 12, sulfur hexafluoride and acetylene gases are introduced alternately for different times.

EXAMPLE 14

While hydrogen gas was continuously introduced into the chamber, sulfur hexafluoride and acetylene were introduced alternately, wherein acetylene was introduced for 3 minutes which was very much longer than the time of introduction of sulfur hexafluoride (30 seconds). The alternating introduction was repeated twice, thereby synthesizing carbon coils.

EXAMPLE 15

While hydrogen gas was continuously introduced into the chamber, sulfur hexafluoride and acetylene were introduced alternately in the same manner as Example 14, wherein sulfur hexafluoride was introduced for 3 minutes which was very much longer than the time of introduction of acetylene (30 seconds). The alternating introduction was repeated twice, thereby synthesizing carbon coils.

EXAMPLE 16

While hydrogen gas was continuously introduced into the chamber, sulfur hexafluoride and acetylene were introduced alternately in the same manner as Example 14, wherein acetylene was introduced for 3 minutes which was very much longer than the time of introduction of sulfur hexafluoride (30 seconds). The alternating introduction was repeated 16 times, thereby synthesizing carbon coils.

EXAMPLE 17

While hydrogen gas was continuously introduced into the chamber, sulfur hexafluoride and acetylene were introduced alternately in the same manner as Example 14, wherein sulfur hexafluoride was introduced for 3 minutes which was very much longer than the time of introduction of acetylene (30 seconds). The alternating introduction was repeated 16 times, thereby synthesizing carbon coils.

COMPARATIVE EXAMPLE 1

Carbon coils were synthesized by introducing only hydrogen and acetylene into the chamber.

Figure 13:
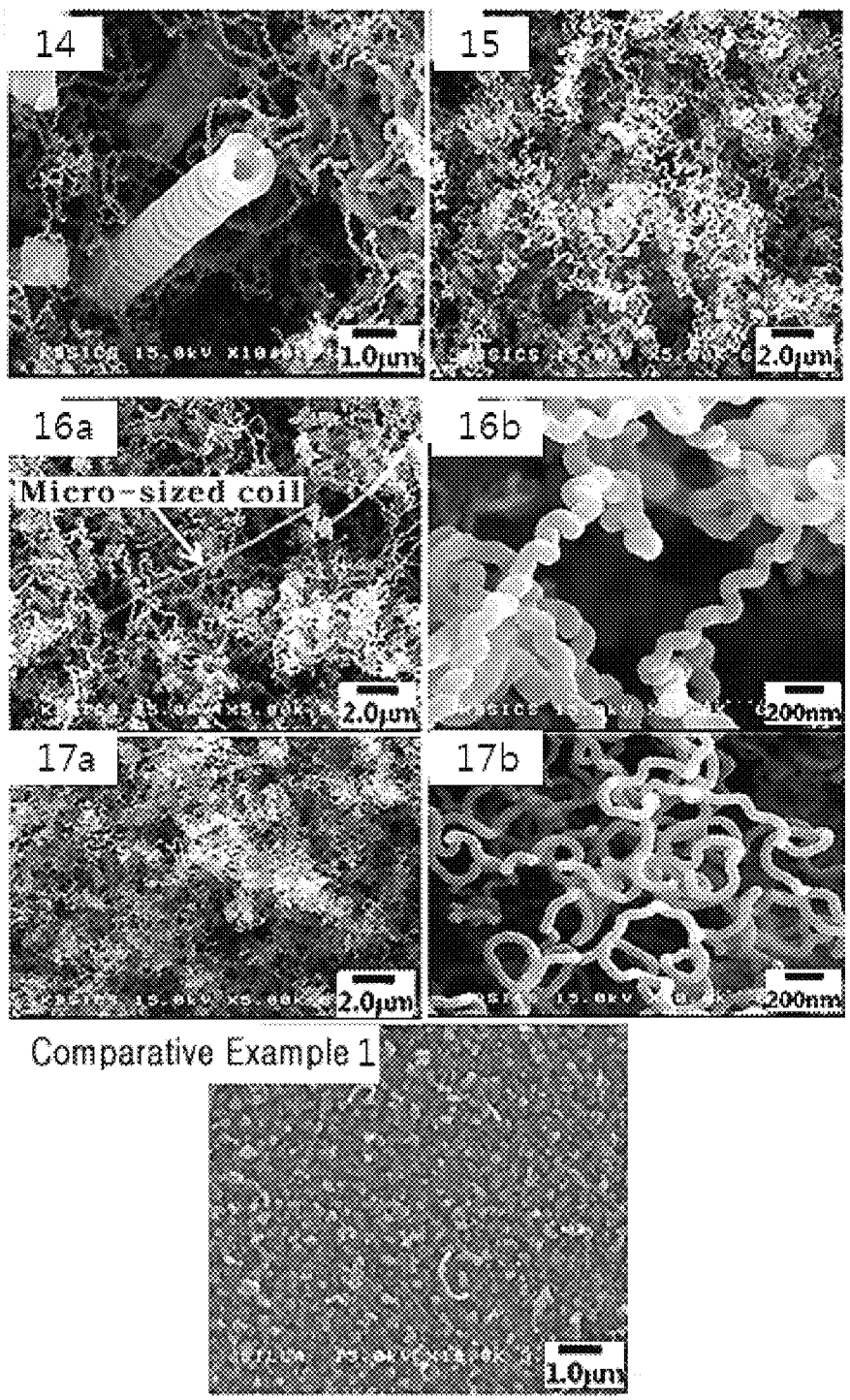
FIG. 13 is a set of FESEM photographs showing carbon coils synthesized in Examples 14 to 17 of the present invention.

FIG. 13 shows the results of FESEM observation for the shapes of the carbon coils synthesized in Examples 14 to 17. As can be seen in FIG. 13, the carbon coils synthesized in Examples 14 to 17 were on the order of micrometers or nanometers and were helical or wavy in shape.

Specifically, as can be seen in photograph 14 in FIG. 13, in the carbon coils synthesized in Example 14, nanosized and microsized carbon coils having the MC shape were well developed. Also, as can be seen in photograph 15 in FIG. 13, in the carbon coils synthesized in Example 15, nanosized carbon coils having the MC shape were well developed. As can be seen in photographs 16a and 16b in FIG. 13, in the carbon coils synthesized in Example 16, nanosized carbon coils having the MC shape were well developed, and microsized carbon coils were rarely synthesized. Also, as can be seen in photographs 17a and 17b in FIG. 13, in the carbon coils synthesized in Example 17, nanosized wave-like carbon coils were well developed.

In comparison with this, the synthesis of carbon coils was attempted in Comparative Example 1. However, when only hydrogen and acetylene were continuously introduced without introducing sulfur hexafluoride, no carbon coils were synthesized, as shown in FIG. 13.

As described above, it can be seen that the introduction of sulfur hexafluoride is necessarily required for the synthesis for carbon coils, and the shape, length and geometry of carbon coils can be controlled by introducing sulfur hexafluoride and acetylene gases alternately for different times and controlling the time of one-time alternating introduction and the number of repeats of alternating introduction.

Figure 14:
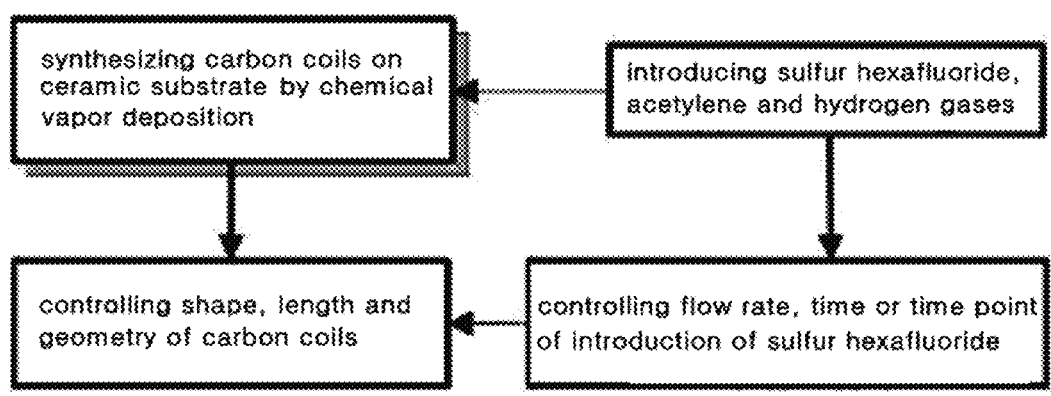
FIG. 14 schematically shows a method for producing carbon coils according to still another embodiment of the present invention.

FIG. 14 shows still another embodiment of the present invention. In this embodiment, sulfur hexafluoride ($SF_6$), acetylene ($C_2H_2$) and hydrogen ($H_2$) gases, which are used as reaction gases to synthesize carbon coils on a substrate, are introduced into the chamber, wherein any one or more of the flow rate and time point of introduction of sulfur hexafluoride are controlled. Specifically, among the reaction gases that are introduced into the chamber during the synthesis of carbon coils, hydrogen and acetylene gases are continuously introduced while any one or more of the flow rate and time point of introduction of sulfur hexafluoride are controlled, whereby the shape, length and geometry of the resulting carbon coils can be controlled.

For example, the shape, length and geometry of the resulting carbon coils can be controlled by continuously injecting predetermined amounts of hydrogen and acetylene gases during the synthesis of carbon coils and changing the flow rate of sulfur hexafluoride according to a process.

In addition, the shape, length and geometry of the resulting carbon coils can be controlled by continuously injecting predetermined amounts of hydrogen and acetylene gases during the synthesis of carbon coils and changing the time point of introduction of sulfur hexafluoride according to a process during the synthesis of carbon coils.

In the present invention, the flow rate of sulfur hexafluoride gas that is introduced into the chamber is controlled to between 5 sccm (standard cc per minute) and 50 sccm. If the flow rate of sulfur hexafluoride gas is less than 5 sccm, no coils will be formed or carbon coils having a desired shape cannot be obtained, and if the flow rate of sulfur hexafluoride gas is more than 50 sccm, desired micro- or nano-sized coils will not be obtained, and it will be difficult to control the shape of carbon coils, carbon coils having a desired shape will not be obtained, and only a filament shape corresponding to a shape prior to carbon coils will be prepared.

As described above, if the flow rate of introduction of sulfur hexafluoride is controlled to between 5 and 50 sccm, the time of introduction of sulfur hexafluoride can also be controlled. Herein, the time of introduction of sulfur hexafluoride is preferably between 2 minutes and 90 minutes. If the time of introduction of sulfur hexafluoride is 2 minutes, the flow rate of introduction of sulfur hexafluoride is preferably controlled to between 20 sccm and 50 sccm. If sulfur hexafluoride is introduced for 2 minutes and the flow rate of introduction is controlled to less than 20 sccm, a filament shape corresponding to that prior to nanosized carbon nanotubes will be obtained, suggesting that the object of the present invention cannot be fulfilled.

In addition, in the present invention, it is possible to control the time point of introduction of sulfur hexafluoride during the synthesis of carbon coils. In the present invention, the synthesis of carbon coils can be divided into the initial stage of synthesis and the middle stage of synthesis, and sulfur hexafluoride gas can be introduced in the initial stage of synthesis or the middle stage of synthesis.

In the present invention, the initial stage of synthesis is within 20% of the first half of the total reaction time for the synthesis of carbon coils. Specifically, with respect to the introduction of sulfur hexafluoride gas in the initial stage of synthesis, acetylene gas is continuously introduced during the synthesis of carbon coils, whereas sulfur hexafluoride gas starts to be introduced within 1 minute after the start of introduction of acetylene gas, and the introduction of sulfur hexafluoride gas is completed within 20% of the first half of the total reaction process time for the synthesis of carbon coils.

As described above, if sulfur hexafluoride gas is introduced in the first stage of synthesis, carbon coils having a desired shape and size can be obtained. However, if sulfur hexafluoride is not introduced or the introduction thereof is not completed within 20% of the first half, no coil shape will be obtained and a filament shape corresponding to that prior to the formation of carbon coils will be obtained.

In addition, in the present invention, the middle stage may be in the range from 1/2 of the total reaction process time for the synthesis of carbon coils to ±20%.

Specifically, acetylene gas is continuously introduced during the synthesis of carbon coils, whereas the introduction of sulfur hexafluoride gas is performed for a time ranging from 1/2 of the total reaction process time for the synthesis of carbon coils to ±20%.

Thus, if sulfur hexafluoride is not introduced in the middle stage of synthesis or the introduction thereof is not performed for a time ranging from 1/2 of the total reaction process time for the synthesis of carbon coils to ±20%, a desired carbon coil shape will not be obtained and a carbon filament shape corresponding to that prior to the formation of carbon coils will be obtained, making it difficult to control the shape, length and geometry of carbon coils.

Figure 15:
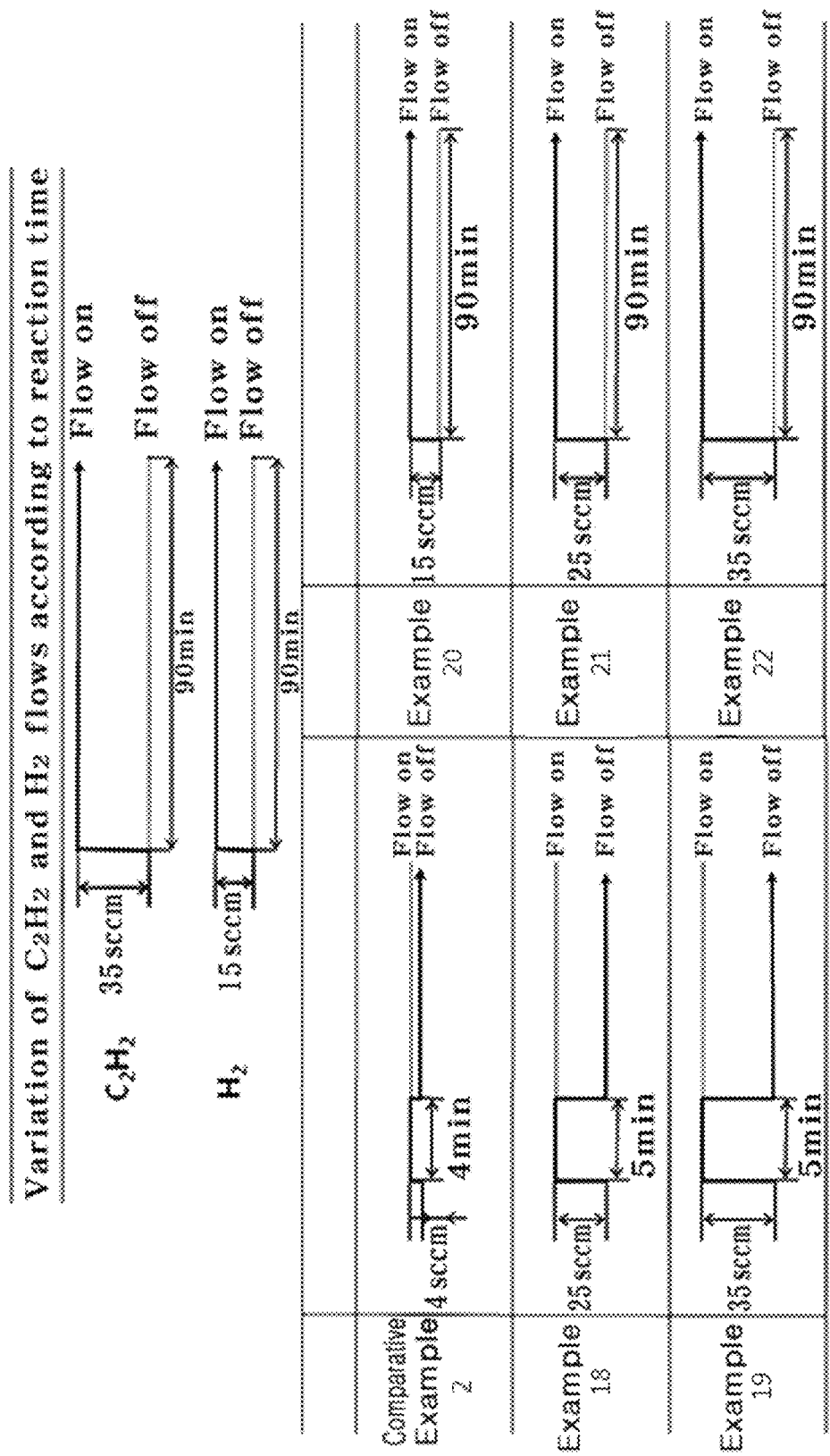
FIG. 15 schematically shows methods for synthesizing carbon coils according to Examples 18 to 22 of the present invention.

In Examples 18 to 22 of the present invention, sulfur hexafluoride, acetylene and hydrogen gases are all introduced into the chamber during the synthesis of carbon coils, wherein hydrogen and acetylene gases are continuously introduced during the synthesis of carbon coils, and the time and flow rate of introduction of sulfur hexafluoride gas are variously controlled, thereby synthesizing carbon coils in FIG. 15.

Specifically, the conditions of a carbon coil synthesis process according to another embodiment of the present invention are as follows.

EXAMPLE 18

While hydrogen and acetylene gases were continuously introduced into the chamber, sulfur hexafluoride was introduced at a flow rate of 25 sccm (25 cc/min) for 5 minutes, thereby synthesizing carbon coils.

EXAMPLE 19

While hydrogen and acetylene gases were continuously introduced into the chamber, sulfur hexafluoride was introduced at a flow rate of 35 sccm (35 cc/min) for 5 minutes, thereby synthesizing carbon coils.

EXAMPLE 20

While hydrogen and acetylene gases were continuously introduced into the chamber for 90 minutes, sulfur hexafluoride was continuously introduced at a flow rate of 15 sccm (35 cc/min) for 90 minutes (corresponding to the time of the synthesis reaction process), thereby synthesizing carbon coils.

EXAMPLE 21

While hydrogen and acetylene gases were continuously introduced into the chamber for 90 minutes, sulfur hexafluoride was continuously introduced at a flow rate of 25 sccm (25 cc/min) for 90 minutes (corresponding to the time of the synthesis reaction process), thereby synthesizing carbon coils.

EXAMPLE 22

While hydrogen and acetylene gases were continuously introduced into the chamber for 90 minutes, sulfur hexafluoride was continuously introduced at a flow rate of 35 sccm (35 cc/min) for 90 minutes (corresponding to the time of the synthesis reaction process), thereby synthesizing carbon coils.

COMPARATIVE EXAMPLE 2

While hydrogen and acetylene gases were continuously introduced for the synthesis of carbon coils, sulfur hexafluoride was introduced at a flow rate of less than 5 sccm (5 cc/min) for less than 5 minutes, thereby synthesizing carbon coils.

Figure 16:
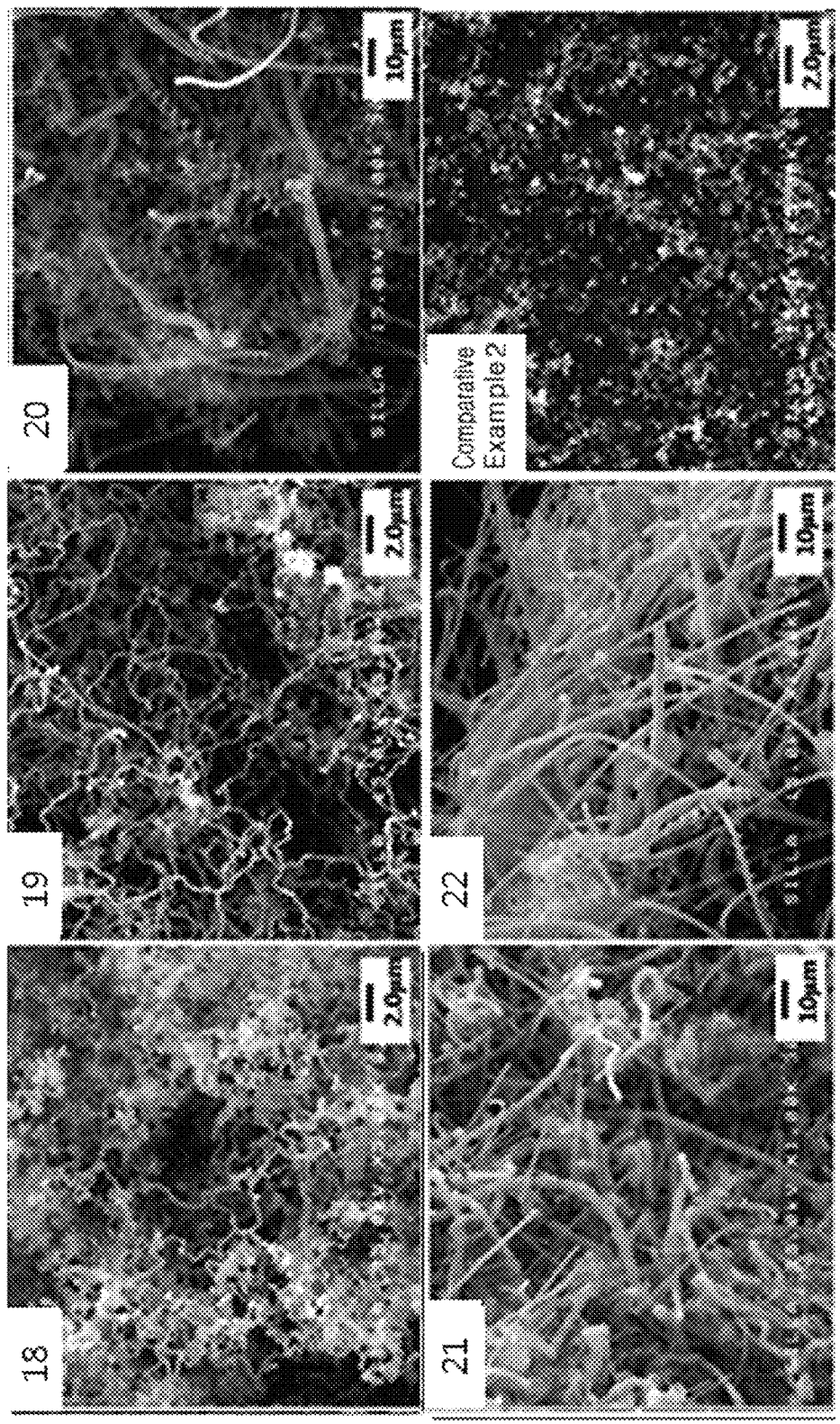
FIG. 16 is a set of FESEM photographs showing carbon coils synthesized in Examples 18 to 22 of the present invention.

FIG. 16 shows the results of FESEM (field emission scanning electron microscopy) observation for the shapes of the carbon coils synthesized in Examples 18 to 22.

Specifically, as can be seen in photograph 18 in FIG. 16, in the carbon coils synthesized in Example 18, nanosized and microsized carbon coils were well developed, and particularly, wave-like carbon coils among the nanosized carbon coils were well developed. As can be seen in photograph 19 in FIG. 16, in the carbon coils synthesized in Example 19, nanosized carbon coils having the MC shape were well developed. As can be seen in photograph 20 in FIG. 16, in the carbon coils synthesized in Example 20, nanosized and microsized carbon coils having various shapes, including the MC, WNC and wave-like shapes, were well developed. As can be seen in photograph 21 in FIG. 16, in the carbon coils synthesized in Example 21, nanosized and microsized carbon coils having various shapes, including the MC, WNC and wave-like shapes, were well developed. Finally, as can be seen in photograph 22 in FIG. 16, which show the carbon coils synthesized in Example 22, microsized carbon coils were well developed.

In comparison with this, the synthesis of carbon coils by the method of Comparative Example 2 was attempted. However, when sulfur hexafluoride was introduced at a flow rate of less than 5 sccm for less than 5 minutes, as shown in FIG. 16, no carbon coils were synthesized, and only the initial shape of nanofilaments appeared.

Thus, it can be seen that the size and shape of carbon coils can be controlled by suitably controlling the flow rate and time of introduction of sulfur hexafluoride during the synthesis of the carbon coils.

Figure 17:
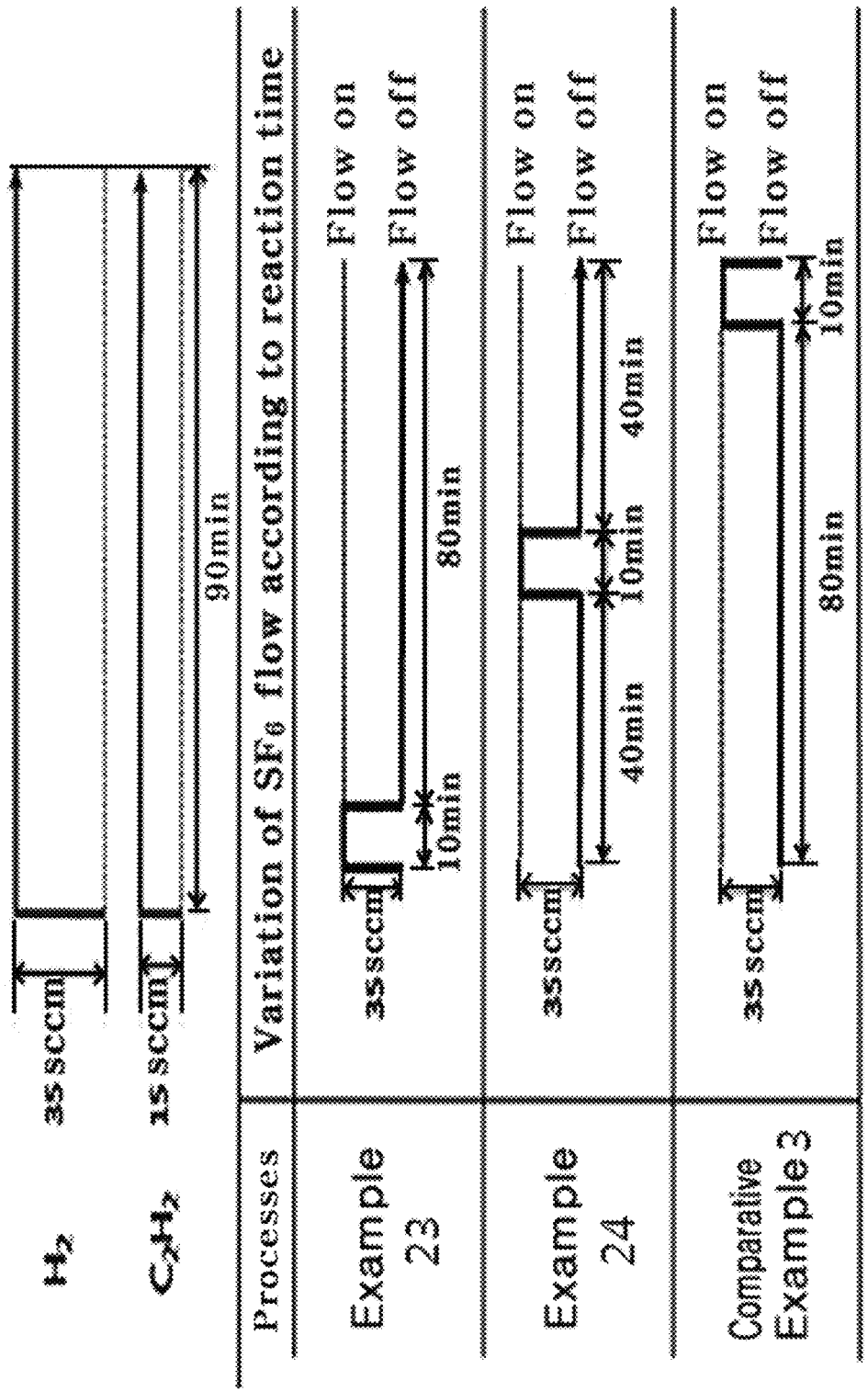
FIG. 17 schematically shows methods for synthesizing carbon coils according to Examples 23 and 24 of the present invention.

In still another embodiment of the present invention, sulfur hexafluoride, acetylene and hydrogen gases are all introduced during the synthesis of carbon coils, wherein acetylene and hydrogen gases are continuously introduced during the synthesis of carbon coils, and the time point of introduction of sulfur hexafluoride is controlled as shown in FIG. 17, thereby synthesizing carbon coils.

Specifically, as shown in FIG. 17, the conditions of carbon coil synthesis processes according to Examples 23 and 24 are as follows.

EXAMPLE 23

In this example, while hydrogen and acetylene gases were continuously introduced, sulfur hexafluoride was introduced at the initial stage of synthesis, thereby synthesizing carbon coils. Herein, with respect to the introduction of sulfur hexafluoride in the initial stage of synthesis, sulfur hexafluoride gas started to be introduced within 1 minute after the introduction of hydrogen and acetylene gases, and the introduction of sulfur hexafluoride was completed within 20% of the first half of the total reaction process time.

EXAMPLE 24

In this example, while hydrogen and acetylene gases were continuously introduced, sulfur hexafluoride was introduced at the middle stage of synthesis, thereby synthesizing carbon coils. Herein, with respect to the introduction of sulfur hexafluoride in the initial stage of synthesis, sulfur hexafluoride gas started to be introduced for a time ranging from 1/2 of the total reaction process time to ±20%.

COMPARATIVE EXAMPLE 3

Hydrogen and acetylene gases were continuously introduced during the synthesis of carbon coils, while sulfur hexafluoride gas was introduced in the last stage of synthesis, thereby synthesizing carbon coils. With respect to the introduction of sulfur hexafluoride gas in the last stage of synthesis, sulfur hexafluoride gas started to be introduced 1 minute before the completion of introduction of hydrogen and acetylene gas, and the introduction thereof continued to the completion of the synthesis process.

Figure 18:
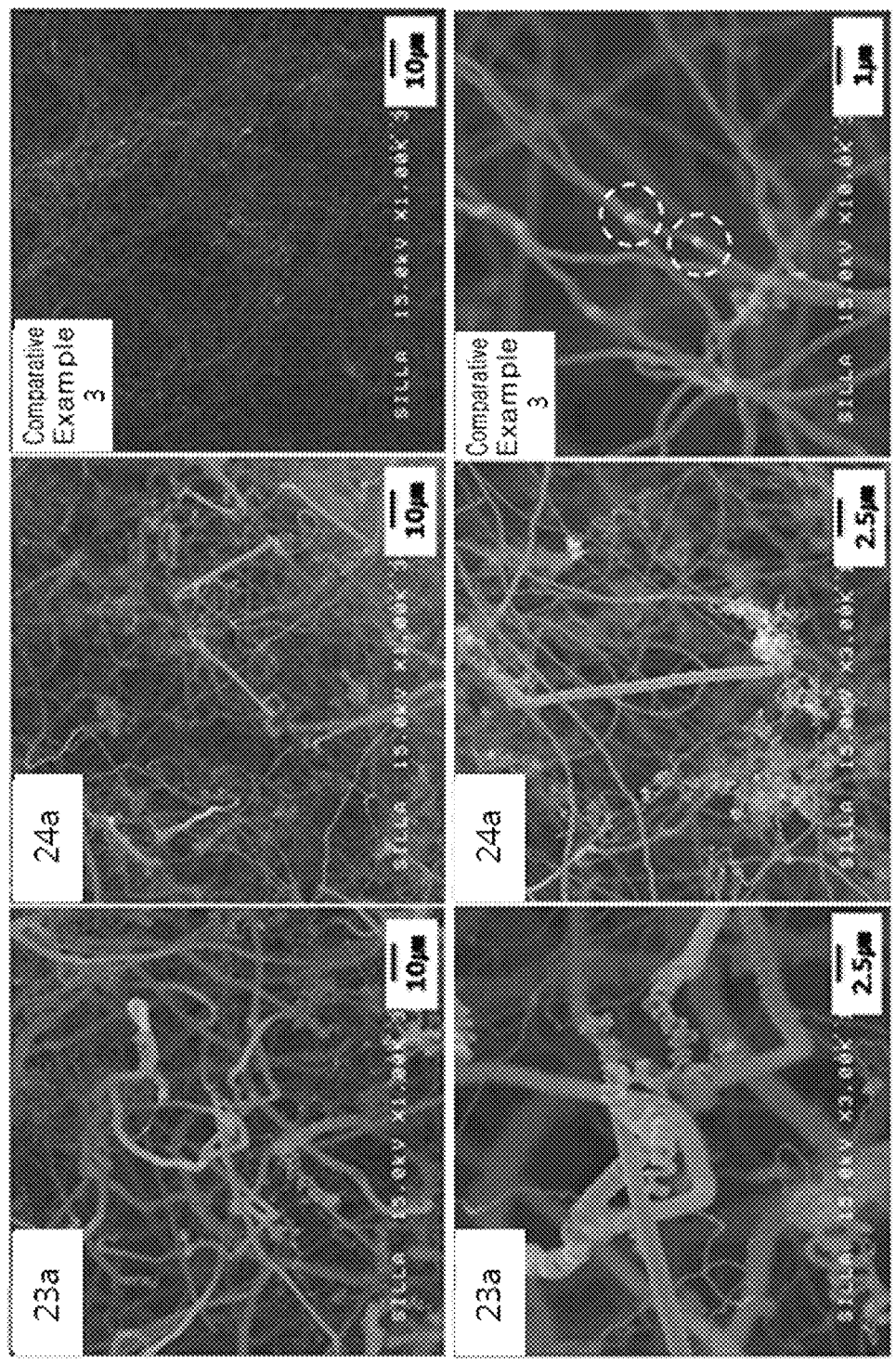
FIG. 18 is a set of FESEM photographs showing carbon coils synthesized in Examples 23 and 24 of the present invention.

FIG. 18 shows the results of FESEM (field emission scanning electron microscopy) observation for the shapes of the carbon coils synthesized in Examples 23 and 24. As can be seen in photographs 23a and 23b, in the carbon coils synthesized in Example 23, microsized carbon coils having the MC shape were well developed. Also, as can be seen in photographs 24a and 24b, in the carbon coils synthesized in Example 24, microsized carbon coils having the MC shape were well developed.

In comparison with this, as can be seen in FIG. 18, in the carbon coils synthesized in Comparative Example 3, microsized carbon coils were not well synthesized, and only linear carbon nanofilaments were formed.

Thus, it can be seen that the size, shape, length and geometry of carbon coils can be controlled by controlling the time point of introduction of sulfur hexafluoride.

The method of preparing carbon coils using sulfur hexafluoride gas as described above is not limited to the disclosure of the above embodiments. The above embodiments can be selectively combined with each other to provide various modifications.

As described above, according to the present invention, the shape, length and geometry of carbon coils can be changed in various manners by introducing sulfur hexafluoride gas during the synthesis of carbon coils and controlling the conditions of the introduction, and thus it is possible to produce carbon coils having reproducible geometry depending on the intended use. Thus, geometrical carbon coils can be produced in large amounts, and the range of application thereof can be widened. In addition, it is possible to control the shape of carbon coils depending on the intended use, and the carbon coils can be industrially easily used.

What is claimed is:

1. A method of producing carbon micro- and nano-coils by synthesizing and growing the carbon coils on a substrate using a chemical vapor deposition system,
wherein sulfur hexafluoride ($SF_6$), acetylene ($C_2H_2$) and hydrogen ($H_2$) gases are introduced into a chamber during synthesis of the carbon coil, and wherein the sulfur hexafluoride and acetylene gases are introduced alternately for predetermined amounts of time to control the shape, length and geometry of the carbon coils.

2. The method of claim 1, wherein the time interval between the start of introduction of any one gas of the sulfur hexafluoride and acetylene gases and the start of introduction of the other gas is controlled to between 5 seconds and 90 minutes.

3. The method of claim 1, wherein the number of repeats of the alternating introduction of the sulfur hexafluoride and acetylene gases is controlled to between 1 and 50.

4. A method of producing carbon micro- and nano-coils by synthesizing and growing the carbon coils on a substrate using a chemical vapor deposition system,
wherein sulfur hexafluoride ($SF_6$), acetylene ($C_2H_2$) and hydrogen ($H_2$) gases are introduced into a chamber during synthesis of the carbon coil, and wherein any one or more of the flow rate, time or time point of introduction of the sulfur hexafluoride are controlled to control the shape, length and geometry of the carbon coils.

5. The method of claim 4, wherein the flow rate of introduction of the sulfur hexafluoride is controlled between 5 sccm (standard cc per minute) and 50 sccm.

6. The method of claim 5, wherein the flow rate of introduction of the sulfur hexafluoride is controlled to between 5 sccm and 50 sccm, and the sulfur hexafluoride is introduced for 2 minutes to 90 minutes.

7. The method of claim 4, wherein the time point of introduction of the sulfur hexafluoride is divided into an initial stage of synthesis and a middle stage, and the sulfur hexafluoride is introduced at the initial stage of synthesis and the middle stage.

* * * * *